W. HOAGG.
BEET HARVESTER.
APPLICATION FILED OCT. 11, 1920.
1,436,501.
Patented Nov. 21, 1922.
5 SHEETS—SHEET 4
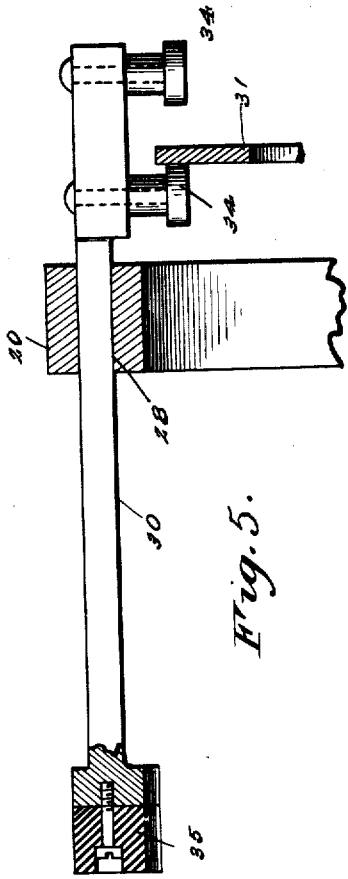
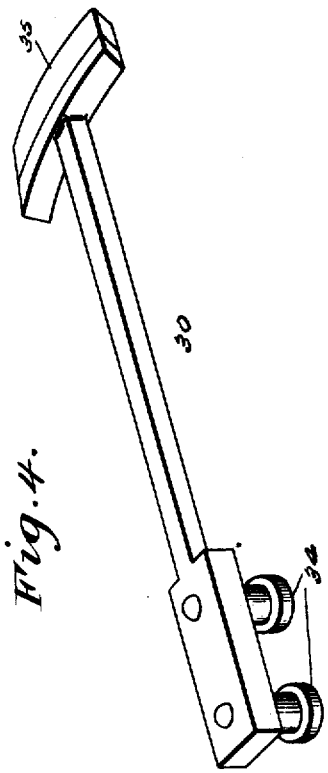
W. Hoagg INVENTOR

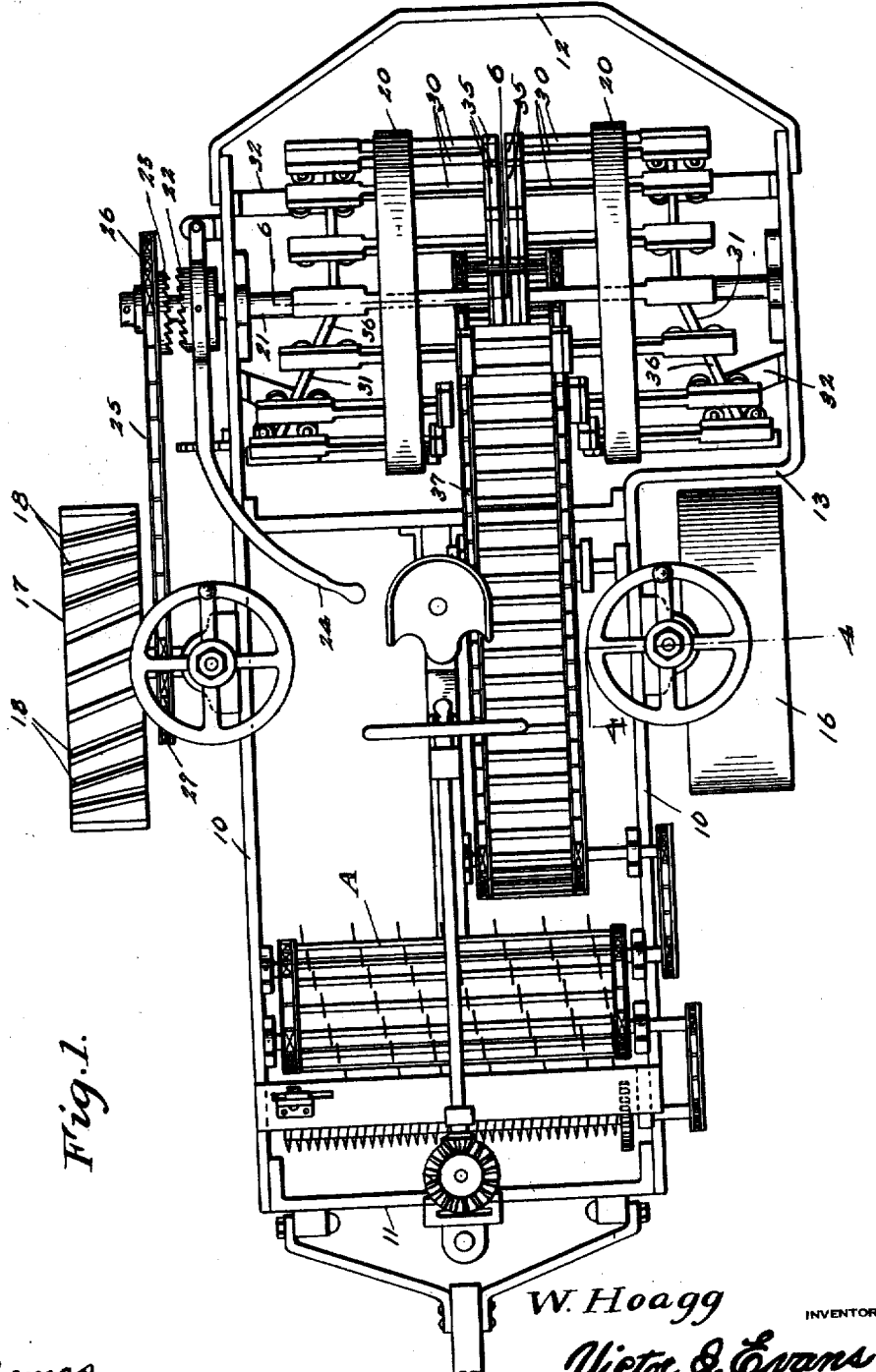

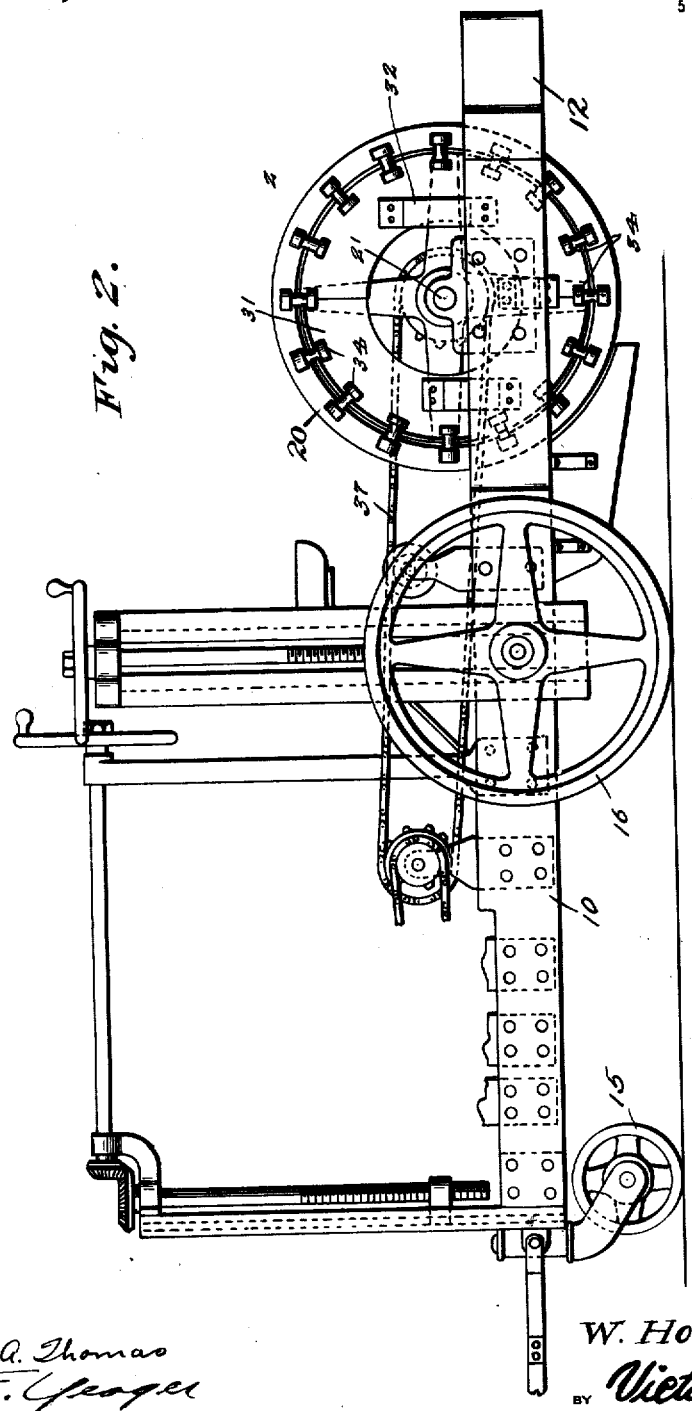

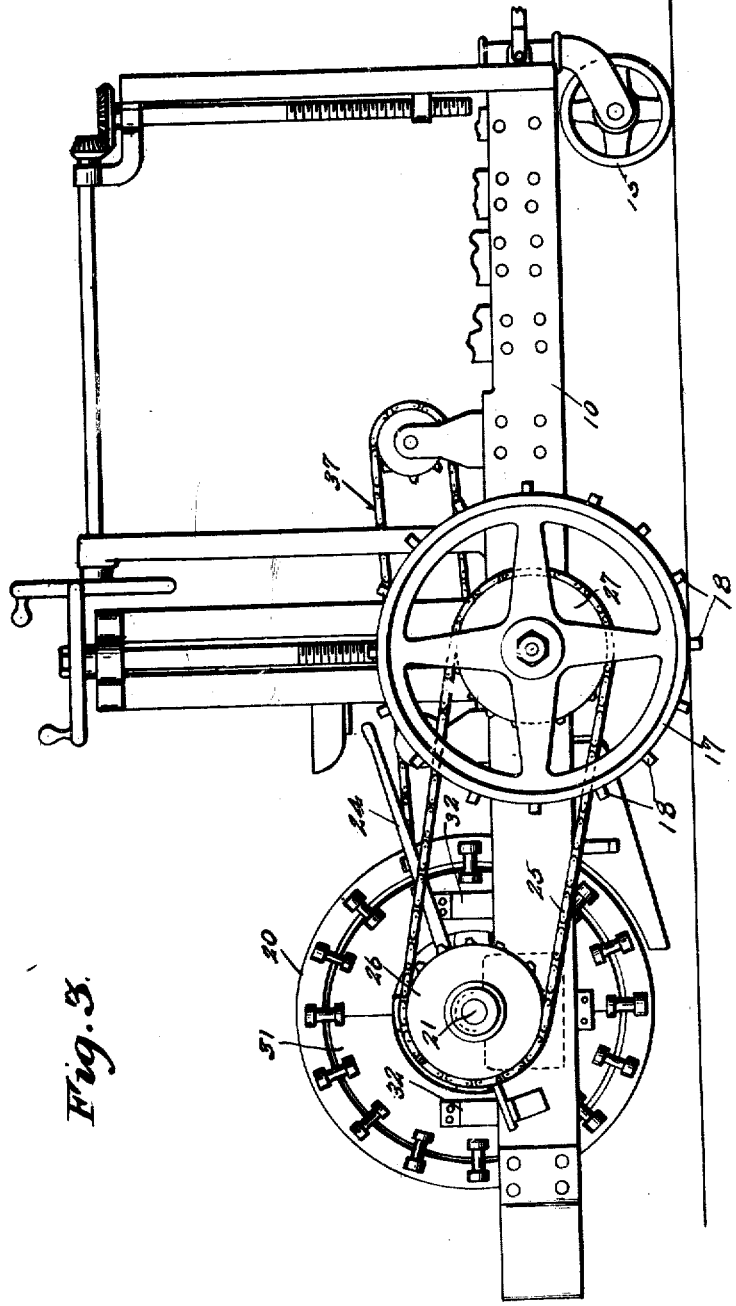

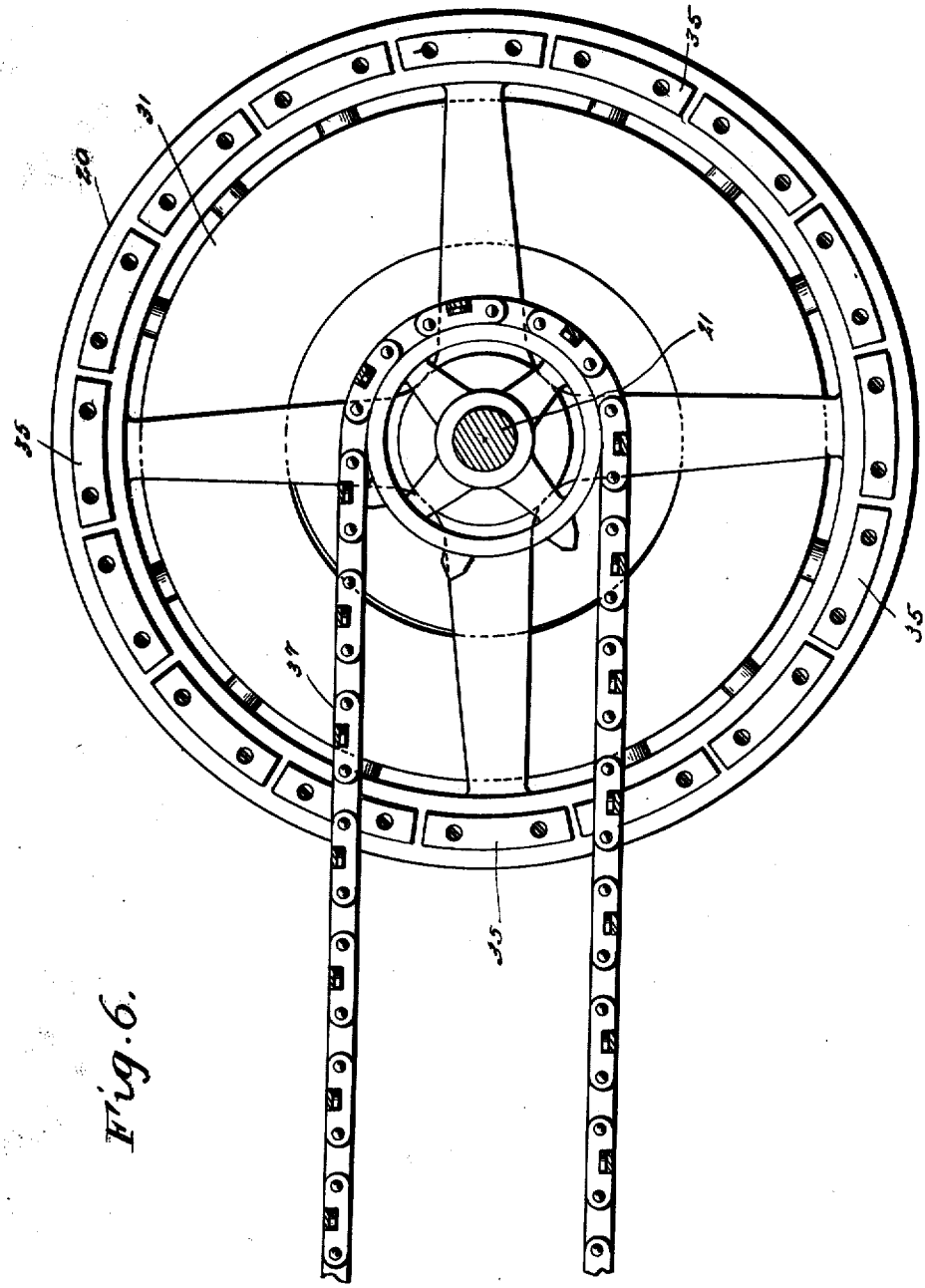

Patented Nov. 21, 1922.

1,436,501

UNITED STATES PATENT OFFICE.

WALTER HOAGG, OF DETROIT, MICHIGAN.

BEET HARVESTER.

Application filed October 11, 1920. Serial No. 415,977.

*To all whom it may concern:*

Be it known that I, WALTER HOAGG, a citizen of the United States, residing at Detroit, in the county of Wayne and State of Michigan, have invented new and useful Improvements in Beet Harvesters, of which the following is a specification.

This invention relates to beet harvesters, and has for its chief characteristic, the providing of means for extracting the beets or roots from the ground in a quick order without injuring the same.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:—

Figure 1 is a top plan view of the machine forming the subject matter of my invention.

Figure 2 is a side elevation thereof.

Figure 3 is a similar view looking from the opposite side of the machine.

Figure 4 is an enlarged detail view of the puller or extracting arms.

Figure 5 is a sectional view taken on line 6—6 of Figure 1.

Figure 6 is a fragmentary view showing the driving means for the beet extracting means.

The machine forming the subject matter of my invention comprises a frame including the spaced side members 10 and end members 11 and 12 respectively. One side of the frame is off-set as at 13 adjacent the rear end thereof to accommodate the beet and root pulling mechanism to be presently described. The frame is of course mounted upon wheels, preferably three in number. The front wheel 15 is of the caster type, while the wheels 16 and 17 respectively are of the tractor type. One or both of the tractor wheels may be provided with calks 18 for obtaining an effective purchase upon the ground.

The mechanism for extracting the roots and beets from the ground consists of a pair of spaced discs or wheels 20 fitted upon the shaft 21, journaled between the side members 10 of the frame. The shaft 21 at a point beyond one side of the machine is provided with clutch members 22 and 23 respectively. A lever 24 is utilized to draw the clutches into and out of engagement. A drive chain 25 is trained over the gear 26 forming part of the clutch member 23, and over a gear 27 fixed upon the hub of the tractor wheel 17. When the clutch members are in operative association, it is manifest that the shaft 21 is rotated by the tractor wheel 17. The shaft 21 is driven a few gyrations faster per minute than the drive wheel 17. Each of the discs or wheels 20 is provided with a plurality of openings 28 adjacent the periphery of the wheel. Arranged to slide through each opening is a root or beet puller arm 30. The arms are arranged horizontally, while the arms of the respective discs or wheels are aligned to work in pairs, the arms of each pair being moved toward and away from each other in successive order at predetermined intervals. Arranged between each wheel or disc 20 and the adjacent side of the frame is a cam 31 secured to the frame by means of the braces or supports 32. The outer end of each arm has journaled thereon a pair of spaced wheels 34 which engage the opposite faces or sides of the adjacent cam 31. The inner ends of the arms 30 are relatively broad and have secured thereto tips 35 of rubber or other soft material. The parts are so arranged, that when the machine is in operation and the wheels 20 are rotated, the arms 30 of the respective wheels are moved toward each other in pairs as the wheels approach the ground to effectively engage the root or beets to be extracted. The arms are moved in this manner by reason of their association with the cam 31, while the rubber tips 35 allow the arms to obtain an effective purchase upon whatever is being extracted from the ground. As the wheels 20 continue to rotate, the beets or roots are extracted from the ground and carried between the arms to a point adjacent the top of the wheels. At this point the rollers 34 start to travel over the off-set portion 36 of each cam 31, and consequently move the arms of each pair away from each other, releasing the beet or root and depositing the same on the endless conveyor 37. The conveyor 37 carries the beets in the direction of the forward end of the machine upon which the topping mechanism is mounted and indicated generally at A. While the machine is primarily intended as a beet puller and topper, it is susceptible for use in pulling beans, onions and other kinds of roots, and a general application is contemplated by the claims. The conveyor 37 is driven from the shaft 21 as shown.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim is:

1. In a machine of the class described, a beet extracting mechanism comprising spaced wheels mounted for rotation, means for rotating said wheels, each wheel having a circumferential series of spaced openings, horizontally disposed arms slidably fitted in each opening, tips associated with said wheels, and means for moving the arms of the respective wheels in pairs toward and away from each other at predetermined intervals.

2. In a machine of the class described, a beet extracting mechanism comprising spaced wheels mounted for rotation, means for rotating said wheels, each wheel having a circumferential series of spaced openings, horizontally disposed arms slidably fitted in said openings and independently movable therein, a cam fixed upon the machine adjacent each wheel and having the outer ends of the arms associated therewith, whereby the arms of the respective wheels move in pairs toward and away from each other at predetermined intervals.

3. In a machine of the class described, a beet extracting mechanism comprising spaced wheels mounted for rotation, means for rotating said wheels, a circumferential series of arms carried by each wheel and independently movable thereon, a cam fixed on the machine adjacent each wheel, a pair of spaced rollers carried by the outer end of each arm and engaging the opposite sides of the adjacent cam, said cam having its offset portion disposed so that the arms of the respective wheels move in pairs toward and away from each other at predetermined intervals.

In testimony whereof I affix my signature.

WALTER HOAGG.